United States Patent
Burkhard et al.

(10) Patent No.: US 7,829,802 B2
(45) Date of Patent: Nov. 9, 2010

(54) ADJUSTABLE PARALLEL-GUIDING MECHANISM FOR COMPACT GRAVIMETRIC MEASURING INSTRUMENTS

(75) Inventors: Hans-Rudolf Burkhard, Wila (CH); Dominique Genoud, Olten (CH); Andreas Metzger, Männedorf (CH); Stephan Baltisberger, Gossau (CH); Thomas Köppel, Oetwil am See (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/611,559

(22) Filed: Nov. 3, 2009

(65) Prior Publication Data
US 2010/0044119 A1    Feb. 25, 2010

Related U.S. Application Data

(63) Continuation of application No. PCT/EP2008/053083, filed on Mar. 14, 2008.

(30) Foreign Application Priority Data

Jun. 1, 2007  (EP) ................... 07109474
Jun. 1, 2007  (EP) ................... 07109475

(51) Int. Cl.
    *G01G 21/24*  (2006.01)
(52) U.S. Cl. .............. 177/210 EM; 177/212; 177/229; 73/862.638; 73/862.639
(58) Field of Classification Search ........ 177/210 EM, 177/211, 229, 212, DIG. 9; 73/862.632–863.634, 73/862.636–862.639
See application file for complete search history.

(56) References Cited

U.S. PATENT DOCUMENTS

| | | | |
|---|---|---|---|
| 4,606,421 A | 8/1986 | Schroeder | |
| 4,653,600 A | 3/1987 | Melcher et al. | |
| 4,798,251 A * | 1/1989 | Maaz et al. ................. | 177/229 |
| 4,964,478 A * | 10/1990 | Stadler et al. ............... | 177/229 |
| 5,205,369 A * | 4/1993 | Neeleman .................... | 177/229 |
| 5,250,762 A * | 10/1993 | Gustafsson et al. ......... | 177/244 |
| 5,866,854 A * | 2/1999 | Emery et al. .................. | 177/50 |
| 6,232,567 B1 | 5/2001 | Bonino et al. | |
| 6,326,562 B1 | 12/2001 | Burkhard et al. | |
| D453,695 S * | 2/2002 | Nordstrom ................... | D10/87 |
| 7,220,924 B2 * | 5/2007 | Burkhard .................... | 177/229 |

(Continued)

FOREIGN PATENT DOCUMENTS

JP     2002-365125 A    12/2002

(Continued)

*Primary Examiner*—Randy W Gibson
(74) *Attorney, Agent, or Firm*—Standley Law Group LLP (57) ABSTRACT

In a parallel-guiding mechanism, a stationary parallel leg surrounds a movable parallel leg. The movable parallel leg is connected to the stationary parallel leg and guided in vertical movement by first and second parallel-guiding elements, fastened respectively to the upper and lower end portions. The movable parallel leg can be connected to a load receiver and to a force-measuring cell through a force-transmitting connection in order to transmit the weighing load. Intermediate to, and connecting, the respective end portions is a tilt-adjustment feature, by which the end portions are tilt-adjusted relative to each other about at least one tilt axis to correct a corner load error. The tilt-adjustment feature is provided by at least one of: a pair of bending zones, a spherical joint and a ring-shaped constriction.

19 Claims, 5 Drawing Sheets

U.S. PATENT DOCUMENTS

| | | | |
|---|---|---|---|
| 7,345,249 B2 * | 3/2008 | Burkhard et al. | 177/210 EM |
| 7,361,852 B2 * | 4/2008 | Leahy et al. | 177/229 |
| 7,365,276 B2 * | 4/2008 | Burkhard | 177/229 |
| 7,371,978 B2 * | 5/2008 | Leahy et al. | 177/238 |
| 7,429,705 B2 | 9/2008 | Genoud et al. | |
| 2009/0283337 A1 * | 11/2009 | Haefeli et al. | 177/180 |
| 2010/0044118 A1 * | 2/2010 | Burkhard et al. | 177/210 EM |

FOREIGN PATENT DOCUMENTS

| | | |
|---|---|---|
| WO | 2005/031286 A1 | 4/2005 |

* cited by examiner

ADJUSTABLE PARALLEL-GUIDING
MECHANISM FOR COMPACT
GRAVIMETRIC MEASURING INSTRUMENTS

CROSS-REFERENCE TO RELATED APPLICATIONS

This application is a continuation under 35 USC §120 of PCT/EP2008/053083, filed 14 Mar. 2008, which is in turn entitled to benefit of a right of priority under 35 USC §119 from European patent applications 07 10 9474.2 and 07 10 9475.9, both of which were filed 1 Jun. 2007. The content of each of the applications is incorporated by reference as if fully recited herein.

TECHNICAL FIELD

The embodiments disclosed herein relate to a parallel-guiding mechanism, specifically for a gravimetric measuring instrument.

BACKGROUND OF THE ART

The known state of the art includes many different designs of gravimetric measuring instruments. Many of the known designs, also referred to as balances, consist essentially of a force-measuring cell, a load receiver that is operationally connected to the force-measuring cell, a parallel-guiding mechanism constraining the load receiver in vertically guided linear movement, an electronic section to process the weighing signal, and an indicator unit.

The known state of the art includes a variety of functional principles of force-measuring cells or measurement transducers such as for example weighing cells with strain gauges, weighing cells with oscillating strings, or weighing cells based on electromagnetic force compensation (EMFC).

In EMFC weighing cells, the weight of the load is transmitted either directly or by way of one or more force-transmitting levers to an electromechanical measurement transducer which delivers a signal corresponding to the weighing load. The signal is further processed by an electronic portion of the weighing instrument and the result is presented on a display.

Weighing cells with a strain transducer contain a deformable body which is provided with strain gauges. Placing the load on the weighing cell causes an elastic deformation of the deformable body. In many cases, the deformable body is configured as a parallelogram-shaped measuring element (parallel-guiding mechanism with strain gauges), whereby defined zones of deformation or bending zones are created where the strain gauges are arranged. As a result of the load placed on the movable parallel leg, the strain gauges are subjected to tension or compression which causes a change of their electrical resistance in comparison to the stress-free state, and the resistance change represents a measure for the applied load.

In force-measuring cells based on string-oscillators, the mechanical design structure is largely analogous to force-measuring cells based on electromagnetic force compensation or strain gauges, except that an oscillating-string transducer is used in place of an electromagnetic measurement transducer or a strain gauge transducer. As a result of the load, the tension in an oscillating string is increased, and the frequency change, in turn, represents a measure for the applied load.

As mentioned above, force-measuring cells of these types are used in a variety of gravimetric measuring instruments, such as for example balances, gravimetric moisture-determination instruments, weighing modules and the like.

Weighing modules essentially are balances of a kind in which the indicator unit is arranged in a separate place from the balance, for example in an installation with a central display unit for several weighing modules. Weighing modules are used with preference in automated production- and testing systems where a plurality of such weighing modules are united in a compound system of compact dimensions.

A weighing module of this kind has essentially a design structure as shown for example in FIG. 1 of EP 1 726 926 A1. The module has a stationary parallel leg of an approximately cubic shape which at the same time forms the stationary frame in the center of which the movable parallel leg—in this case a vertically movable rod which carries a weighing pan at the top—is constrained in vertically guided movement by diaphragm springs that are arranged, respectively, near the top and bottom of the stationary parallel leg.

However, this strikingly simple concept still has the drawback that it lacks the capability to adjust the parallelism of the diaphragm springs that guide the vertical movement. As is known in the field of weighing, deviations from parallelism between the guide elements of a parallel-guiding mechanism in a balance cause so-called corner load errors, i.e. weighing errors which occur when a weighing load is placed out of center on the load receiver.

The corner load error or, stated in positive terms, the corner load accuracy is a fundamental property of balances with a parallel-guided load receiver. Although one might attempt to achieve a desired degree of corner load accuracy through higher precision in the manufacturing process, this increases on one hand the manufacturing costs of balances and weighing modules, while on the other hand even the highest achievable accuracy of a machine tool falls short of attaining the corner load accuracy of the order of about $1/50,000$ to $1/1,000,000$ of the weighing capacity.

For this reason, one uses a fundamentally different approach with high-precision balances, in that on the one hand a relatively wide tolerance in the machining accuracy of the relevant components is accepted from the outset, while on the other hand adjustment possibilities are provided at the critical points of the parallel-guiding mechanisms, whereby the parallelism of the guide members can be adjusted to the level that meets the required corner load accuracy. This adjustment of the corner load accuracy is performed following the assembly phase in the now operational gravimetric measuring instrument, using an automatic or manual inspection and adjustment process which may include additional settings, for example for the linearity adjustment and the span calibration.

In a parallelogram-shaped measuring element, i.e. a parallel-guiding mechanism which constrains the weighing pan carrier in a parallel movement by means of two parallel, essentially horizontal parallel guides, corner load errors are caused primarily by the fact that the parallel guides deviate slightly from an ideal, absolutely parallel alignment. The relative magnitude of the corner load error, i.e. the ratio between the error of the indicated weight and the amount of the test weight being used corresponds approximately to the relative geometric deviation by which the error is caused. A distinction is made between a corner load error in the lengthwise direction and a corner load error in the transverse direction of the parallel-guiding mechanism, in accordance with the direction in which the test weight is shifted on the weighing pan in the corner load test of the balance. A corner load error in the lengthwise direction occurs when the vertical distance of the parallel guides at the end where they are connected to the stationary parallel leg is not exactly the same as at the opposite end where they are connected to the movable parallel leg. A corner load error in the transverse direction on the other hand occurs when the two parallel guides are twisted relative to each other, i.e. a condition where the distance between the parallel guides varies across the width of the parallel guides.

A corner load adjustment feature of this kind is disclosed for example in U.S. Pat. No. 4,606,421 A1. The stationary parallel leg of the parallel-guiding mechanism disclosed in that reference has elastically deformable bending zones located in different respective planes above each other. The tilt axis of the first bending zone is oriented in the lengthwise direction of the parallel-guiding mechanism, while the tilt axis of the second bending zone is arranged at a right angle to the lengthwise direction of the parallel-guiding mechanism. By means of four adjustment screws, the upper end portion of the stationary parallel leg can be tilt-adjusted in relation to the lower end portion of the stationary parallel leg, whereby the corner load errors in the lengthwise as well as in the transverse direction can be corrected.

As has already been mentioned, weighing modules of the kind named above, for example as described and illustrated in EP 1 726 926 A1, lack the capability for adjusting the parallelism of the diaphragm springs that guide the load receiver, so that only a limited level of corner load accuracy can be achieved in these modules even with precise and thus cost-intensive manufacturing methods.

There is an object to provide a parallel-guiding mechanism, preferably for a compact weighing module, wherein the capability of adjusting the parallelism of the parallel guides is realized through a simple, functionally reliable and cost-effective feature, whereby a specified corner load accuracy can be set by adjustment, so that no narrow and hard-to-meet tolerances have to be imposed on the manufacturing process of a parallel-guiding mechanism.

SUMMARY

This task is solved by a parallel-guiding mechanism in accordance with claim 1. The parallel-guiding mechanism, which can be used in a gravimetric measuring instrument, has a stationary parallel leg which in the operating state of the parallel-guiding mechanism is oriented vertically and has an upper and a lower end portion. The stationary parallel leg surrounds a movable parallel leg whose central longitudinal axis is oriented vertically when in the operating state. The parallel-guiding mechanism further includes a first parallel-guiding element fastened to the upper end portion and a second parallel-guiding element fastened to the lower end portion. By means of these parallel-guiding elements, the movable parallel leg is connected to the stationary parallel leg and guided in vertical movement. The movable parallel leg can be connected to a load receiver and to a force-measuring cell in order to transmit the weighing load.

The upper end portion and the lower end portion are connected to each other through at least one pair of bending zones and/or at least one spherical joint and/or at least one ring-shaped constriction, so that for the correction of a corner load error the end portions can be tilted relative to each other about at least one tilt axis.

In the case of a pair of bending zones the at least one tilt axis passes through the two bending zones of a pair, and the central longitudinal axis of the movable parallel leg is arranged in a vertical plane between the two bending zones of a pair. The bending zones thus form connecting zones through which the upper and the lower end portion are connected.

In the case of a spherical joint, the at least one tilt axis is arranged in a plane that contains a contact circle of the spherical joint, wherein the central longitudinal axis of the movable parallel leg is arranged inside the contact circle of the spherical joint. The term "contact circle" refers to the circular line or ring-shaped circular area along which the two parts that form the spherical joint are in contact with each other. The term "contact circle" can also be interpreted as an infinite number of contact points. A spherical joint can also be reduced to the extent that the contact circle remains in place only along individual sections. Depending on the degree of sphericity that the parts of the spherical joint have in the area of the contact circle, there will be at least two points of contact. The contact points of the contact circle are thus likewise connecting zones through which the upper and the lower end portion are connected. Unlike the preceding arrangement with pairs of bending zones, the orientation of the tilt axis in a spherical joint is not defined. The orientation of the tilt axis in the plane of the contact circle is determined in the adjustment process.

In the case of a ring-shaped constriction, the at least one tilt axis is located in a plane that contains the neutral fiber of the ring-shaped constriction, and the central longitudinal axis of the movable parallel leg is located within a bore hole of the ring-shaped constriction. In the theory of elasticity, the term "neutral fiber" relates to a body that is subjected to bending and means a physical line that is neither shortened nor stretched as a result of the bending. The ring-shaped constriction, too, contains an infinite number of contact points or connection points through which the upper and the lower end portion are joined together. The ring-shaped constriction thus provides a connection which allows the end portions of the stationary parallel leg to be tilted against each other in any direction. The short ring-shaped constriction can be configured in such a way that it can be bent in any desired direction, whereby a non-parallelism of the diaphragm guide springs and thus a corner load error of the parallel-guiding mechanism in any direction can be corrected. As in the case of the spherical joint, the orientation of the tilt axis in the plane of the constriction is determined only in the course of the adjustment process.

The three design possibilities for connecting the upper and the lower end portion of the parallel-guiding mechanism to each other have the common trait that the central longitudinal axis of the movable parallel leg is always located between at least two points of connection.

This has critical advantages. As a result of having at least two points of connection arranged in separate locations from each other, a very precisely defined connection is created wherein the position of the tilt axis is maintained and wherein stresses, which are caused only by the forces acting on the load receiver, nearly cancel each other. This level of precision cannot be attained with the corner load adjusting device that is disclosed in U.S. Pat. No. 4,606,421. Since the connecting zones in U.S. Pat. No. 4,606,421 have to sustain the permanent state of stress introduced by the forces from the adjustment screws, the connecting zones need to have a cross-sectional profile of a certain size that is large enough to prevent them from settling, i.e. plastically yielding, during operation, which would make the parallel-guiding mechanism unusable. Based on the given width of the parallel-guiding mechanism, this corner load adjusting arrangement further has connecting zones of a cross-sectional profile with a length to width ratio much too unfavorable to precisely define a tilt axis. Since the adjustment of the corner load requires only a very small change of the tilt angle of the upper end portion in relation to the lower end portion, the actual position of the tilt axis in connecting zones of this type is very strongly affected by variations due to inhomogeneous material properties and machining tolerances. In connecting zones with a wide profile, the position and orientation of the connecting zones can change continuously during the tilting movement. This has a negative effect on the ability to adjust the corner load error in the lengthwise direction separately from the corner load error in the transverse direction and thus makes the adjustment process more difficult.

Further, if the arrangement for the corner load adjustment had only one connecting zone on the stationary parallel leg, this would create the danger that this connecting zone could buckle or yield elastically under a load acting on the load receiver, in particular due to transverse forces acting on the load receiver, whereby the geometry of the parallel-guiding mechanism would be changed and the weighing signal of the force-measuring cell would to a critical extent be negatively affected. Due to the fact that the central longitudinal axis of the movable parallel leg is arranged between the at least two connecting zones, the forces acting one the load-receiving part and thus on the end portions are reliably taken up in the stationary parallel leg. This has the consequence that in contrast to the state-of-the-art solutions, the parallel-guiding mechanism has no adjustment screws, which would cause a forced deformation and thus additional stress, in order to prevent buckling under adverse load conditions. The connecting zones in the parallel-guiding mechanism can therefore be designed with exceptionally small dimensions. As described hereinafter in more detail, it may even be redundant to use fixation elements.

The stationary parallel leg includes the two end portions as well as all parts that are arranged between the two end portions and serve to connect the parallel guides to the stationary side of the parallel-guiding mechanism. The central longitudinal axis of the stationary parallel leg corresponds to the centroid axis or the neutral fiber of the entire parallel leg. A base structure connecting the stationary parallel leg to solid ground is thus not part of the stationary parallel leg.

The term "surrounds" in this context should be interpreted to mean that the movable parallel leg is arranged within a projected profile area of the stationary parallel leg. For example, a stationary parallel leg with a C-shaped profile could be said to surround a movable parallel leg as long as the movable parallel leg is arranged within the area embraced by the C-shaped parallel leg, even though the C-shaped parallel leg is open on one side.

In a preferred embodiment of the parallel-guiding mechanism, the at least one tilt axis and the central longitudinal axis of the movable parallel leg have a common point of intersection. As could be determined in experiments, with the arrangement having two connecting zones and a common point of intersection between the tilt axis and the central longitudinal axis, there is almost no change of the zero point caused by the corner load adjustment, as the average distance between the end portions of the stationary portion remains largely unchanged. This has a further advantage which can never be achieved in a parallel-guiding mechanism with only one connecting zone as disclosed for example in U.S. Pat. No. 4,606,421. In the parallel-guiding mechanisms according to this reference, the distance between the lower and the upper bending pivot is changed in the adjustment process. Now the corner load adjustment in the lengthwise direction also affects the corner load adjustment in the transverse direction and vice versa, so that the adjustment has to be performed through an iteration in multiple steps until the desired corner load accuracy in the longitudinal and in the transverse direction has been established.

In a further embodiment of the parallel-guiding mechanism, the at least one tilt axis is in addition arranged at a right angle to the central longitudinal axis of the stationary parallel leg. This offers special advantages in the setting of the corner load accuracy. If a test weight is placed in the middle of the load receiver and the indicator is reset to zero, the corner load accuracy of the parallel-guiding mechanism can be adjusted in the most straightforward manner. Due to the symmetric arrangement of the tilt axis and assuming that the weight is shifted from the central longitudinal axis by an equal distance in both directions, the changes in the measurement signal when the test weight is subsequently shifted between two diametrically opposite points on the load receiver will be of identical magnitude. They will differ from each other only by having opposite signs.

The adjustment method to set the corner load accuracy of the parallel-guiding mechanism or of a gravimetric measuring instrument equipped with this mechanism is therefore extremely simple.

In a first step, a test weight is placed in the middle of the load receiver, and the indicator is "tared" (reset to zero).

In a second step, the test weight is moved preferably in the direction perpendicular to a first tilt axis (if applicable) and placed at the edge of the load receiver.

In a third step, the upper end portion is tilt-adjusted in relation to the lower end portion about the first tilt axis until the indicator displays a value of zero.

In a fourth step, the test weight is moved in the direction of the first tilt axis and placed at the edge of the load receiver.

In a fifth step, the upper end portion is tilt-adjusted in relation to the lower end portion about a second tilt axis oriented at a right angle to the first tilt axis until the indicator displays a value of zero.

For verification, the test weight can be placed at diametrically opposite points after the respective adjustments. Experiments have shown that in such verification tests the indicator showed only minimal deviations.

The adjustment method for a parallel-guiding mechanism with a spherical joint or with a ring-shaped constriction is even simpler than the method that has just been described. After the point in the adjustment process where the indicator has been reset to zero, the direction of the largest deviation can be determined by moving the test weight around the edge of the load receiver. Next, by making a tilt adjustment about a tilt axis oriented at a right angle to the direction of the largest deviation, the tilt angle between the end portions is adjusted until the indicator shows a value of zero.

To secure the adjusted tilt angle, there can be at least one fixation element to immobilize the tilt-adjustable end portions relative to each other. The fixation element could also be designed to serve as a means for adjusting the tilt-adjustable end portions. The fixation means only serve to secure the setting that has been made. Unlike the adjustment screws in devices of the prior art, the fixation means are not required to take up any forces acting on the load receiver.

Adjustment screws a normally made of other materials than the stationary parallel leg. Thus, their coefficient of thermal expansion and modulus of elasticity are different from those of the stationary parallel leg. Since the adjustment screws also take up a part of the forces acting on the load receiver, the parallelism in prior-art parallel-guiding mechanism can be subject to temporary changes due to temperature effects, and as a result, the corner load errors of the gravimetric measuring instrument are strongly temperature-dependent. As the parallel-guiding mechanism has no such adjustment screws, there is thus the further benefit of a significantly improved temperature behavior of the gravimetric measuring instrument.

Preferably, the stationary parallel leg, which has a vertical central axis, is designed rotationally symmetric, and the parallel-guiding elements are configured as soft elastic diaphragm guide springs.

As explained above, designing the parallel-guiding mechanism with the best possible symmetry opens the way to a very simple process for setting the corner load accuracy. Ideally, the movable parallel leg is therefore arranged in such a way in relation to the stationary parallel leg that the central longitudinal axis of the stationary parallel leg and the central longitudinal axis of the movable parallel leg coincide with each other.

At least one pair of bending zones is formed by means of at least two lateral incisions between the upper end portion and the lower end portion of the stationary parallel leg. Each bending zone is in essence a narrow material bridge that can be elastically and/or plastically deformed by applying a force or a torque, so that through a forced deformation of the two material bridges, the tilt-adjustable end portions, and thus the zones of attachment of the parallel-guiding elements that are connected to the end portions can be tilt-adjusted about at least one tilt axis and as a result of the tilt adjustment a corner load error of the parallel-guiding mechanism can be corrected. The deformable material bridge can be part of a monolithically designed parallel leg, or it could also be a separate component which together with other components forms the stationary parallel leg. Of course, it is also possible that the entire parallel-guiding mechanism as a whole is of a monolithic design.

The parallel-guiding mechanism can have two first incisions in a first horizontal plane (in the operating state of the parallel-guiding mechanism), starting from diametrically opposite sides of the stationary parallel leg and ending up close to a first diameter of the stationary parallel leg, so that two narrow material bridges are formed between the two first incisions. In addition, in a second horizontal plane which in the operating state of the parallel-guiding mechanism extends below the first horizontal plane, two second horizontal incisions are formed, starting from diametrically opposite points below the aforementioned two first material bridges and ending up close to a second diameter of the stationary parallel leg, so that there are likewise only two narrow second material bridges left in place between the two second incisions. As a result, an intermediate ring portion is formed between the first and second incisions so that the upper end portion is connected to the lower end portion by way of the first material bridges, the intermediate ring portion, and the second material bridges. The first and second material bridges are configured as pairs of deformable bending zones. The intermediate ring portion and the deformable bending zones together form a gimbaled connection between the end portions.

Of course, this gimbaled connection could be arranged in a single plane, analogous to the arrangement of a ship's compass, in which case the upper end portion, the intermediate ring portion and the lower end portion need to have different dimensions in a plane that is orthogonal to the central longitudinal axis.

In the present context, expressions such as "above", "below", "horizontal", "vertical" and the like always refer to the orientation of the parallel-guiding mechanism in the normal state of operation of the gravimetric measuring instrument in which the parallel-guiding mechanism is being used, in other words to the direction of gravity.

The narrow material bridges are now sufficiently pliable to function as defined bending zones (hereinafter referred to as first and second bending zones, analogous to the material bridges), so that the first diameter passing through the first bending zones forms a first tilt axis and the second diameter passing through the second bending zones forms a second tilt axis. As can be concluded from the foregoing description, the first and the second tilt axes are orthogonal to each other, so that the first and second bending zones together with the intermediate ring portion produced by the incisions described above form a tilt-adjustable support of the ring-shaped end portion with the upper diaphragm guide spring, in an arrangement that is comparable to a gimbaled suspension as mentioned above.

To improve the adjustability of the stationary parallel leg of the parallel-guiding mechanism even further, there could be further deformable material bridges produced by adding further incisions after the two first incisions. With further pairs of incisions starting from diametrically opposite points and ending up close to a diameter of the stationary parallel leg in further horizontal planes below the first horizontal plane in relation to the operating state of the parallel-guiding mechanism, additional pairs of diametrically opposite material bridges can be formed in an analogous manner. These pairs are preferably offset from each other by equal angular intervals. Together with the intermediate ring portions formed by the incisions, these material bridges form a support that allows the end portion and the diaphragm spring mounted in it to be tilted in all directions.

While the orthogonality of the two tilt axes is advantageous, it is not absolutely required. Instead of a 90° offset, the two second bending zones could be offset from each other by any angle that is significantly different from zero, as would for example be the case with pairs of incisions in three horizontal planes lying above each other. As a result, a first, second and third pair of bending zones would be formed with respective angular offsets of 60° from each other.

As the stationary parallel leg has several sections which are tilt-adjustable relative to each other for the purpose of correcting a corner load error, the stationary parallel leg can be mounted on solid ground at the upper end portion or the lower end portion or, if applicable, at an intermediate end portion.

It is of advantage if the at least one narrow material bridge is plastically deformable by applying a force or a torque, so that by plastically deforming the material bridges a permanent angular position adjustment of the end portions in relation to each other about at least one tilt axis can be effected, whereby a permanent correction of the corner load error can be achieved. In order to accomplish this, the material bridges that function as bending zones have to be still stiff enough that on the one hand the end portion that is to be tilt-adjusted is secured firmly enough in its normal horizontal position, but that this horizontal position, more specifically the parallelism with the lower diaphragm guide spring, can on the other hand still be fine-adjusted by applying a sufficient amount of force or torque, for example through the engagement of a lever tool at the ring-shaped upper end portion, whereby a permanent plastic deformation of the bending zone is effected. This eliminates the need to use adjustment-setting elements to permanently maintain the tilt adjustment, such as adjustment screws, wedges and the like. Of course, these adjustment elements can still be used to secure the tilt adjustment, in particular for parallel-guiding mechanisms that are exposed to strong adverse forces.

To precisely set a tilt adjustment, it is advantageous if the respective adjustable end portion of the stationary parallel leg has gripping locations for the engagement of a suitable tool that generates a torque and can be removed again after the adjustment has been made. Such gripping locations can be most easily produced by means of bore holes in the stationary parallel leg. If the incisions are narrow gaps, the flanks of the gaps formed by the incisions can serve as the gripping locations for a crowbar-shaped lever that is set into the gap.

Depending on the design of the parallel-guiding mechanism, the adjustable end portion of the stationary parallel leg can also include suitable adjustment-setting means to apply the force or torque, such as adjustment screws, eccentric screws, differential screws, adjustable wedges, levers, or conical pegs.

Ideally the stationary leg, in the operating position of the parallel-guiding mechanism, is an essentially straight vertical circular cylinder. Incisions can therefore be arranged at any place on the circumference.

However, the stationary parallel leg can also have a square, hexagonal or octagonal tubular profile. Preferably the stationary parallel leg is configured as a monolithic tubular section wherein material portions have been removed by milling, grinding, drilling, spark erosion and the like. To keep the overall height of the parallel-guiding mechanism small, it is of advantage if the removed material portions are configured as narrow incisions.

Depending on the design of the gravimetric measuring instrument, it is possible to arrange the force-measuring cell between the parallel legs of the parallel-guiding mechanism. In order too allow unhindered access to the force-measuring cell and, if applicable, to the components of a signal-processing unit, the stationary parallel leg can have a lateral access opening.

However, in some cases this kind of access may be undesirable if unauthorized manipulations in the gravimetric measuring instruments need to be prevented. All parts of the gravimetric measuring instrument with the exception of the indicator unit, i.e. an entire weighing module in the sense defined previously, could be arranged inside the parallel-guiding mechanism. In order to gain access to the force-measuring cell and its electronic components, one would first have to disassemble the parallel-guiding mechanism, which would inevitably put the latter out of adjustment. The illicitly opened weighing module could be identified by checking the corner load accuracy and could be taken out of operation.

Based on knowledge of the field of the art, the following variations are likewise conceivable and are considered to be within the scope of this disclosure.

For the sake of clarity in describing the subject, the parallel leg which surrounds the other parallel leg has hereinabove consistently been referred to as the stationary parallel leg which surrounds the movable parallel leg. As is obvious, the surrounding parallel leg, if functionally connected to the force-measuring cell and the load receiver, can also be the movable parallel leg, and the parallel leg surrounded by it can be mounted on solid ground as the stationary parallel leg.

Further for the sake of clarity, it has been consistently stated above that the adjustable tilt of the end portions is achieved through a suitable configuration of the stationary parallel leg. Of course, such a suitable configuration can also be realized in the movable parallel leg.

Conceivable variations where for example another element that allows a tilt adjustment is arranged between the end portions and where the position of the end portions relative to each other is adjusted for example by securing means are likewise considered included in this disclosure. As an example, the parallel-guiding mechanism can include a deformable metallic bellows or a rubber ring and there can be at least one means of fixation between the end portions to set and secure the adjustment.

BRIEF DESCRIPTION OF THE DRAWINGS

Details of the gravimetric measuring instrument, in particular of the parallel-guiding mechanism in the disclosed embodiments, and of the method for adjusting the mechanism, will be explained in more detail based on the following drawings, wherein identical parts are identified by identical part numbers and wherein.

DETAILED DESCRIPTION

Figure 1:
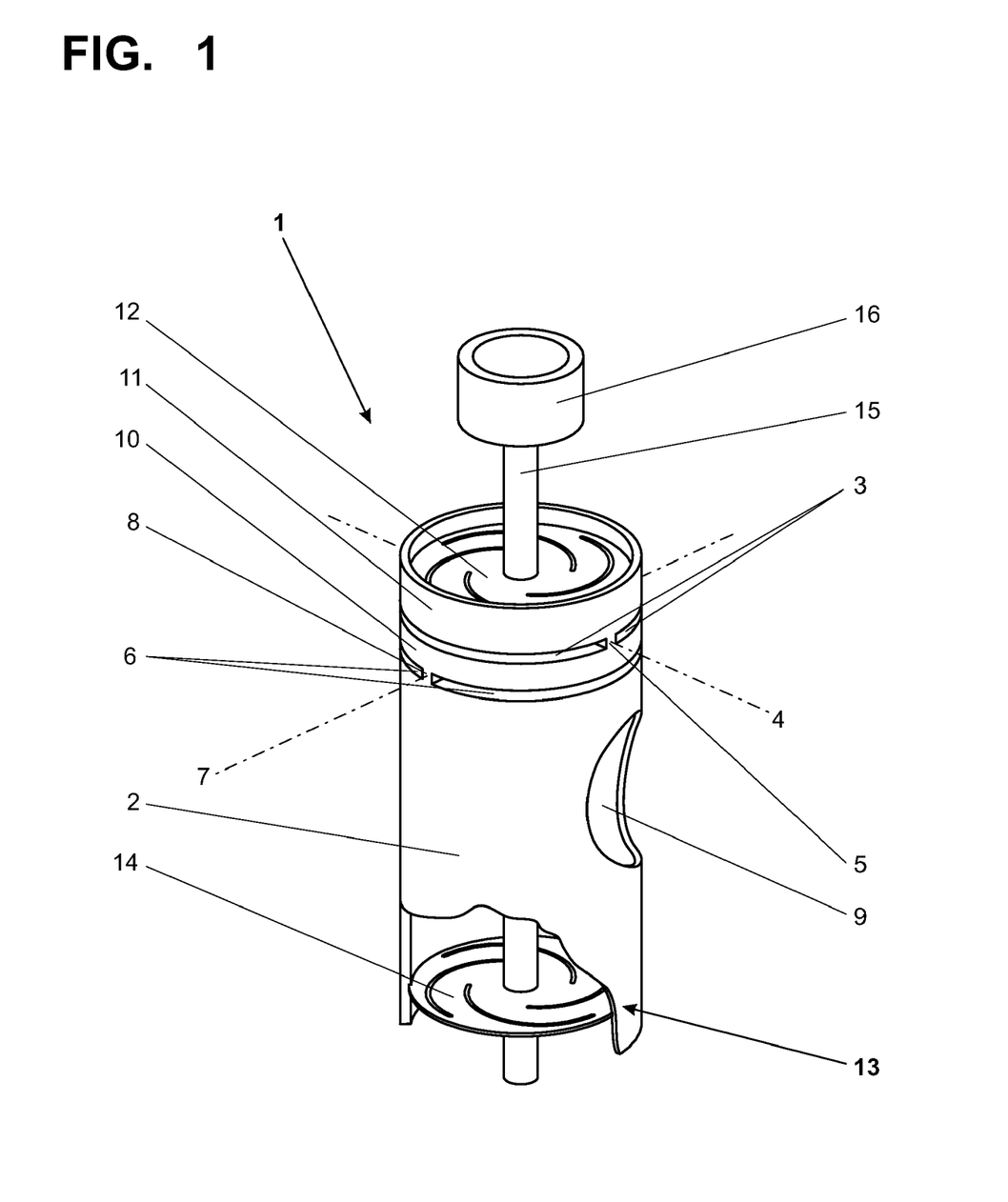
FIG. 1 is a perspective view of an embodiment of a parallel-guiding mechanism.

FIG. 1 illustrates a parallel-guiding mechanism 1 in a three-dimensional view. The stationary parallel leg, identified by the reference symbol 2, has at its upper end first horizontal incisions 3 slitting the stationary parallel leg 2 nearly halfway, ending up close to a diameter 4, so that only two narrow material bridges 5 (only one of which is visible in FIG. 1) are left in place. The second horizontal incisions 6 and the material bridges 8 (only one of which is visible in FIG. 1) which lie at opposite ends of the diameter 7 are arranged below the first horizontal incisions 3 and offset by 90° against the latter. An opening 9 in the stationary parallel leg 2 gives access to the space inside the stationary parallel leg 2 and, for example, to a force-measuring cell (not shown in FIG. 1) which may be arranged there. As a further possibility, one could also arrange the entire signal-processing unit in this interior space, or components of the signal-processing unit such as for example a memory module (EAROM) with adjustment data, an analog/digital converter circuit and a position transducer. The adjustment data are essentially correction values for use by a signal-processing unit that is connected to the force-measuring cell. They are specific to the individual force measuring cell and have been determined immediately before delivery from the factory. If the interior space is large enough, even a display unit could be accommodated in it.

The material bridges 5 and 8 and the ring-shaped portion 10 lying between them form a kind of gimbaled support (also referred to as a cardanic suspension) of the ring-shaped end portion 11 of the stationary parallel leg 2. The ring-shaped end portion 11 forms the border mount of the upper diaphragm guide spring 12. Inside the lower end portion 13 of the stationary parallel leg 2, the lower diaphragm guide spring 14 is mounted in an analogous manner. A vertically movable parallel leg 15 which is arranged in the center of the stationary parallel leg 2 is connected to the two diaphragm guide springs 12 and 14 and constrained by them so as to allow a vertical displacement within a limited range. In addition, the vertically movable parallel leg 15 forms the force-transmitting member between the load receiver 16 and the force-measuring cell which is arranged inside the stationary parallel leg 2.

Figure 2:
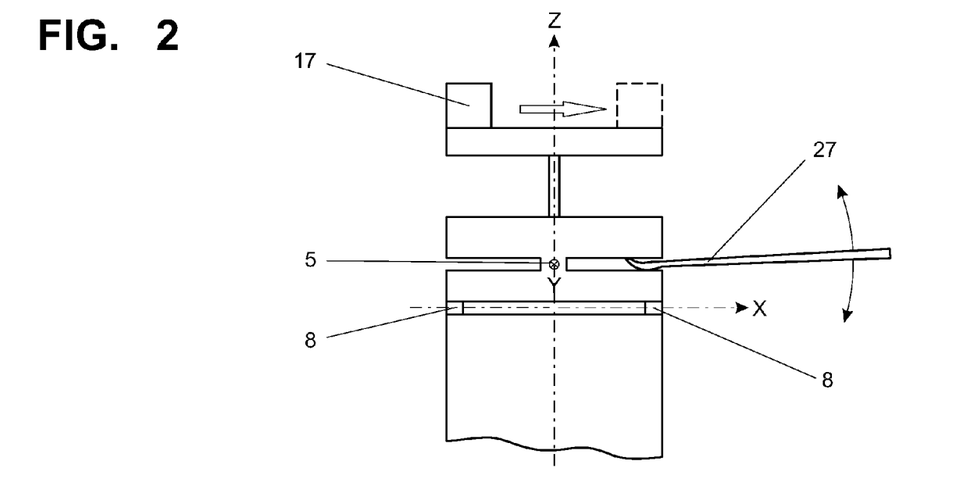
FIG. 2 is a plan view of the FIG. 1 parallel-guiding mechanism, taken in the direction of a first tilt axis, illustrating the shifting of the test weight for the determination of the corner load error.
Figure 3:
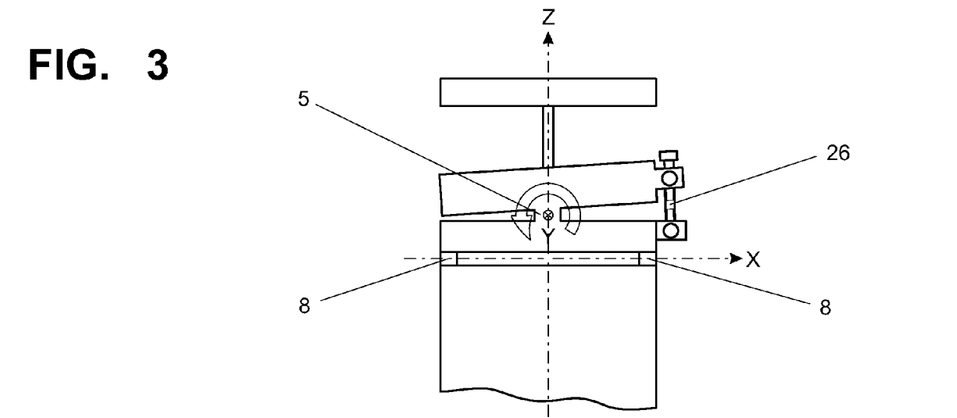
FIG. 3 is another plan view of the FIG. 1 parallel-guiding mechanism with a tilt-adjusted first end portion and a deformed bending zone, also showing a means of fixation.

FIGS. 2 and 3 represent a schematic detail view of the front side of the upper part of the stationary parallel leg 2 with the incisions and bending zones. A cartesian coordinate system is shown for reference, wherein the x-direction lies in the plane of the drawing and passes through the two second bending zones 8, the y-direction is oriented at a right angle in the direction to the rear of the drawing plane and passes through the two first bending zones 5, and the z-axis extends in the vertical direction in the drawing plane as the symmetry axis of the cylindrical stationary parallel leg 2. Except for the fact that the tilt axes defined by the bending zones lie in different horizontal planes, there is no difference between the x-direction and the y-direction in this arrangement from either a geometrical or a mechanical point of view in regard to the adjustment behavior. A corner load error in the x-direction (i.e. a difference between the respective weight readings when a test weight 17 is shifted on the weighing pan 16 in the x-direction for example from left to right, as indicated in FIG. 2) is corrected by tilt-adjusting the ring-shaped end portion 11 about the y-axis. Analogously, a corner load error in the y-direction (i.e. a difference between the respective weight readings when a test weight is shifted on the weighing pan in the y-direction from the front to the rear) is corrected by tilt-adjusting the ring-shaped end portion 11 about the x-axis. The tilt adjustment is made with an adjustment-setting means 27, or it can also be made directly with a fixation means 26 as shown in FIG. 3, wherein the fixation means remains in place on the parallel-guiding mechanism for the purpose of securing the tilt angle. Between the algebraic amount (magnitude and sign) of a corner load error component and the tilt adjustment required for the correction, i.e. the magnitude and direction of the angular displacement, there is a reproducible correlation which is specific to a given weighing module design and is determined through empirical experiments and/or analytical calculations during the development of the weighing module.

For example in the parallel-guiding mechanism 1 shown in FIGS. 1-3, if the shifting of a test weight 17 (see FIG. 2) in the x-direction from left to right produces a negative corner load error (which means that the weight reading for the right-hand position of the weight is smaller than for the left-hand position), this can be corrected by adjusting the tilt angle of the ring-shaped end portion 11 by an amount that depends on the size of the corner load error and is directed in the negative sense of rotation about the y-axis (i.e. counterclockwise, as shown in FIG. 3).

Figure 4:
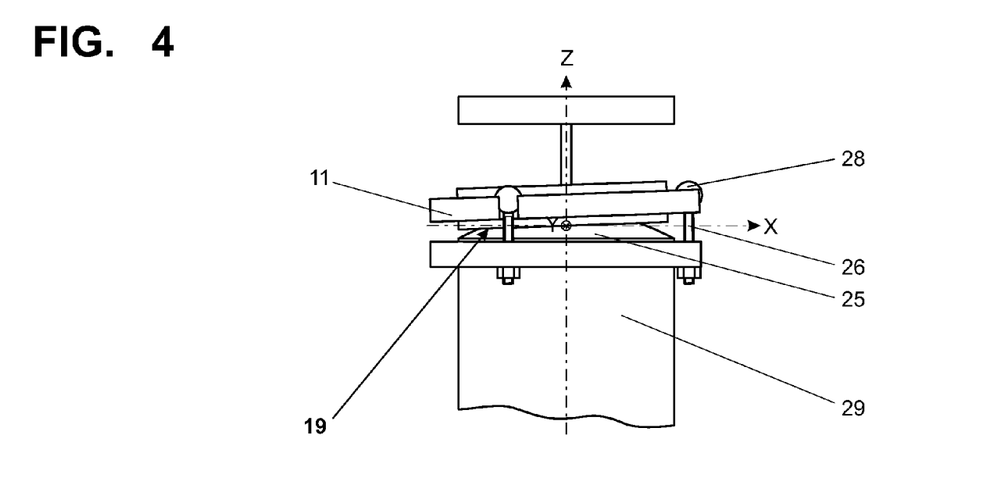
FIG. 4 is another plan view of the FIG. 1 parallel-guiding mechanism with a tilt-adjusted first end portion, wherein a spherical joint is arranged between the main portion of the housing and the first end portion instead of the bending zone.

The parallel-guiding mechanism shown in FIG. 4 differs from the preceding examples in that, instead of the material bridges, it contains a spherical joint 25 with fixation means 26 between the upper ring-shaped end portion 11 and the intermediate ring portion 10. The spherical joint 25 is formed by a ring-shaped spherical zone which is formed on the intermediate ring zone 10 and by the inner edge of the ring-shaped end portion 11 which rests on the ring-shaped spherical zone. This inner edge represents the contact circle 19. For a fixed connection between the intermediate ring portion 10 and the ring-shaped end portion 11, fixation means 26 are provided which, since they are adjustable, can simultaneously serve for the adjustment of the corner load errors. The number of fixation means 26 is not dictated by any specific requirement. Ideally, however, only three fixation means 26 are distributed over the circumference of the ring-shaped end portion 11, in order to avoid unbalanced stresses due to a static over-determination. Of course, the fixation means also need to be able to adapt to angular misalignments occurring as a consequence of the corner load adjustment. This is indicated symbolically in FIG. 4 with a tilt-adaptable contact element 28.

Figure 5:
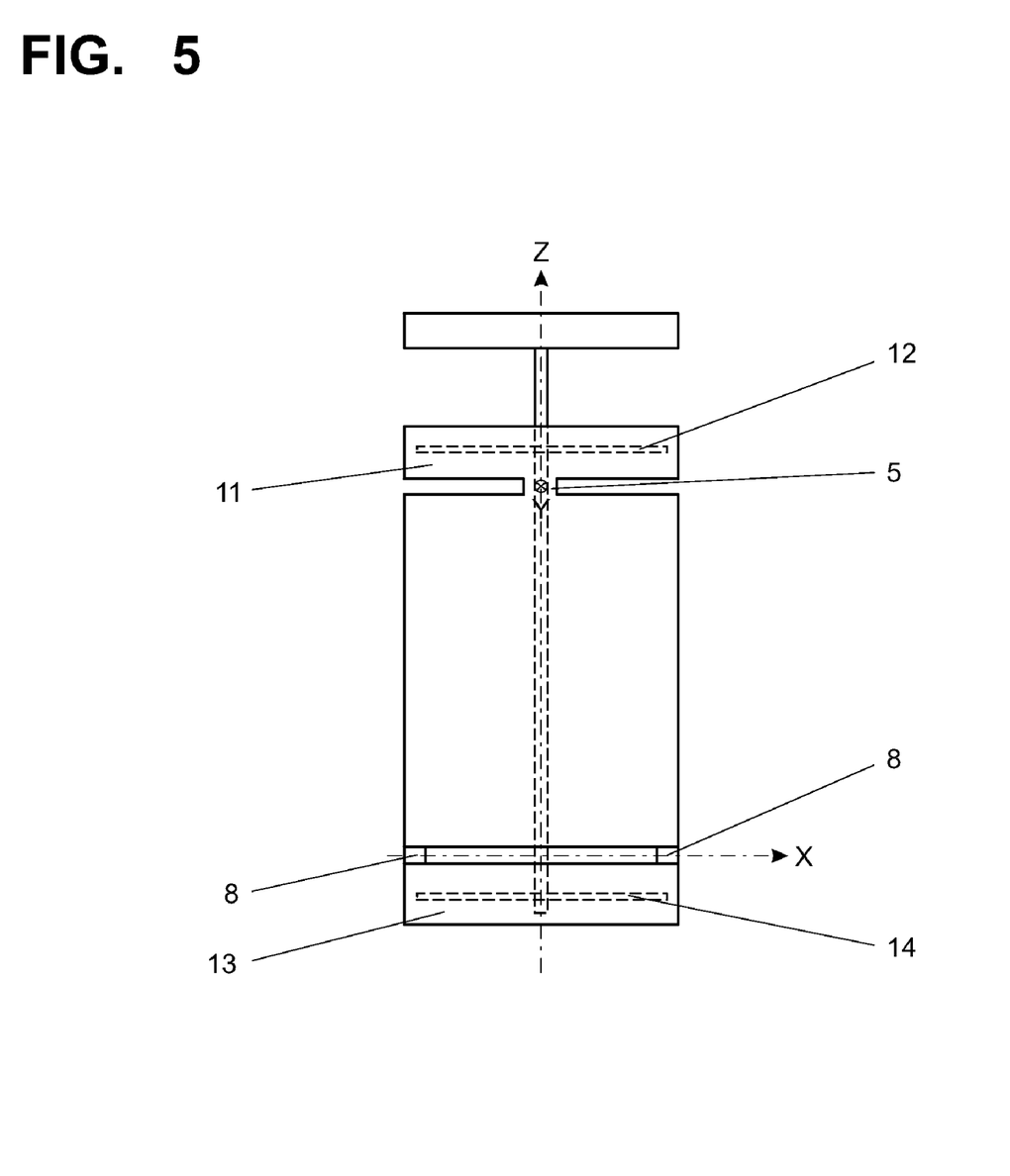
FIG. 5 is an alternate embodiment of the parallel-guiding mechanism of the preceding figures, wherein the upper ring-shaped end portion is tilt-adjustable about a y-axis that is orthogonal to the plane of the drawing and the lower ring-shaped end portion is tilt-adjustable about and x-axis that lies in the plane of the drawing.

As a variation of the parallel guiding mechanism 1 according to the preceding drawing figures, the same adjustability of the corner load error components in the x- and y-directions can also be achieved with an arrangement in accordance with FIG. 5. The upper ring-shaped end portion 11 which holds the upper diaphragm guide spring 12 is designed to be tilt-adjustable by means of bending zones 5 about a tilt axis that extends in the y-direction (i.e. perpendicular to the drawing plane), while the lower ring-shaped end portion 13 which holds the lower diaphragm guide spring 14 is designed to be tilt-adjustable about a tilt axis that extends in the x-direction (i.e. in the drawing plane) and is formed by the bending zones 8. The correction of the corner load error in the x-direction is accomplished here by a tilt adjustment of the upper ring-shaped end portion 11, and the correction of the corner load error in the y-direction is accomplished by a tilt adjustment of the lower ring-shaped end portion 13.

Figure 6:
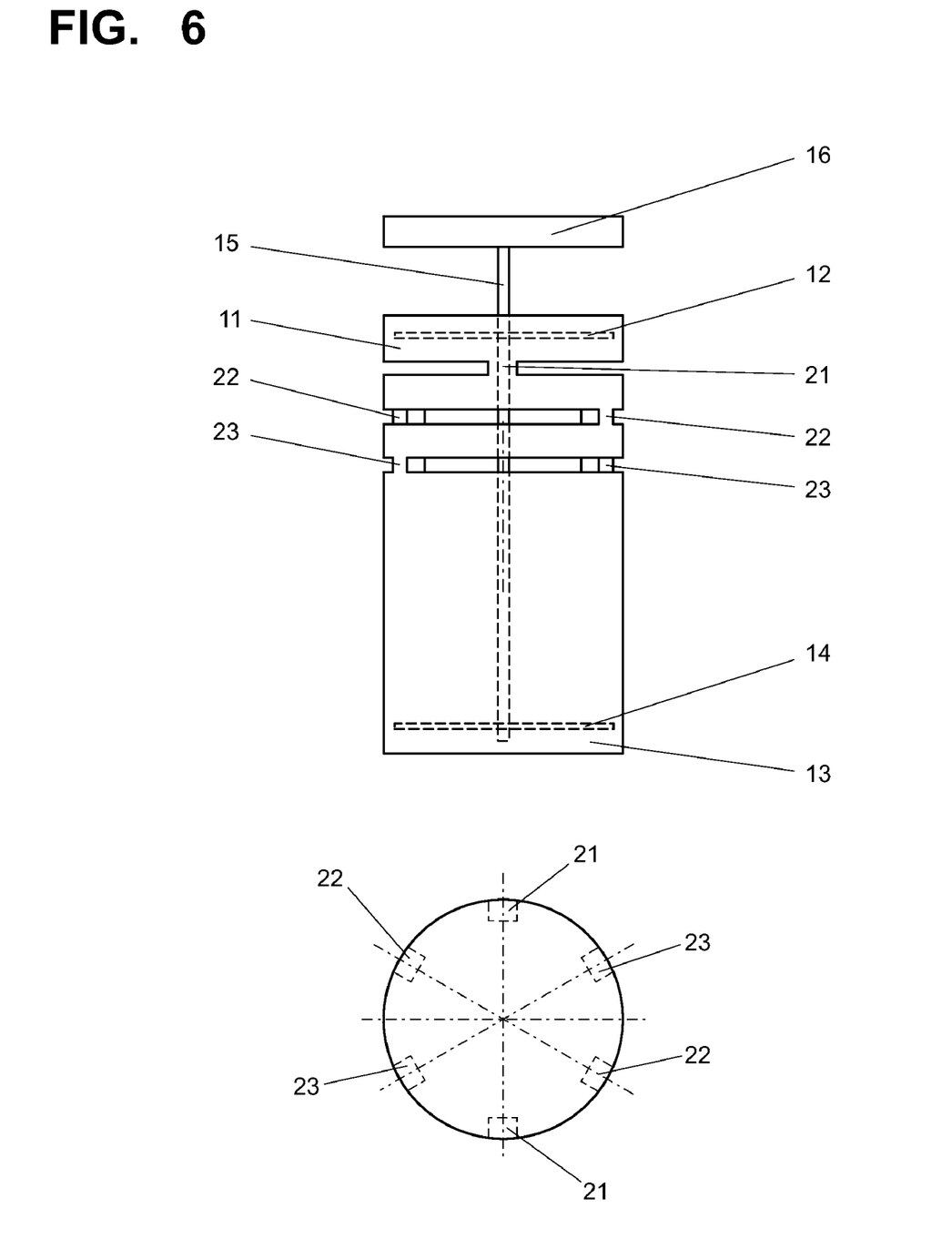
FIG. 6 is a further embodiment of the parallel-guiding mechanism with three tilt axes formed by pairs of bending zones that are offset from each other by 60°.

FIG. 6 shows a further possible way in which the inventive concept can be realized with three pairs of incisions and thus three pairs of bending zones 21, 22, 23 which are offset by 60° from each other. The other elements that are shown with reference symbols correspond to the embodiment according to FIGS. 1-3. Analogous arrangements with an even higher number of evenly offset pairs of bending zones are likewise conceivable.

Figure 7:
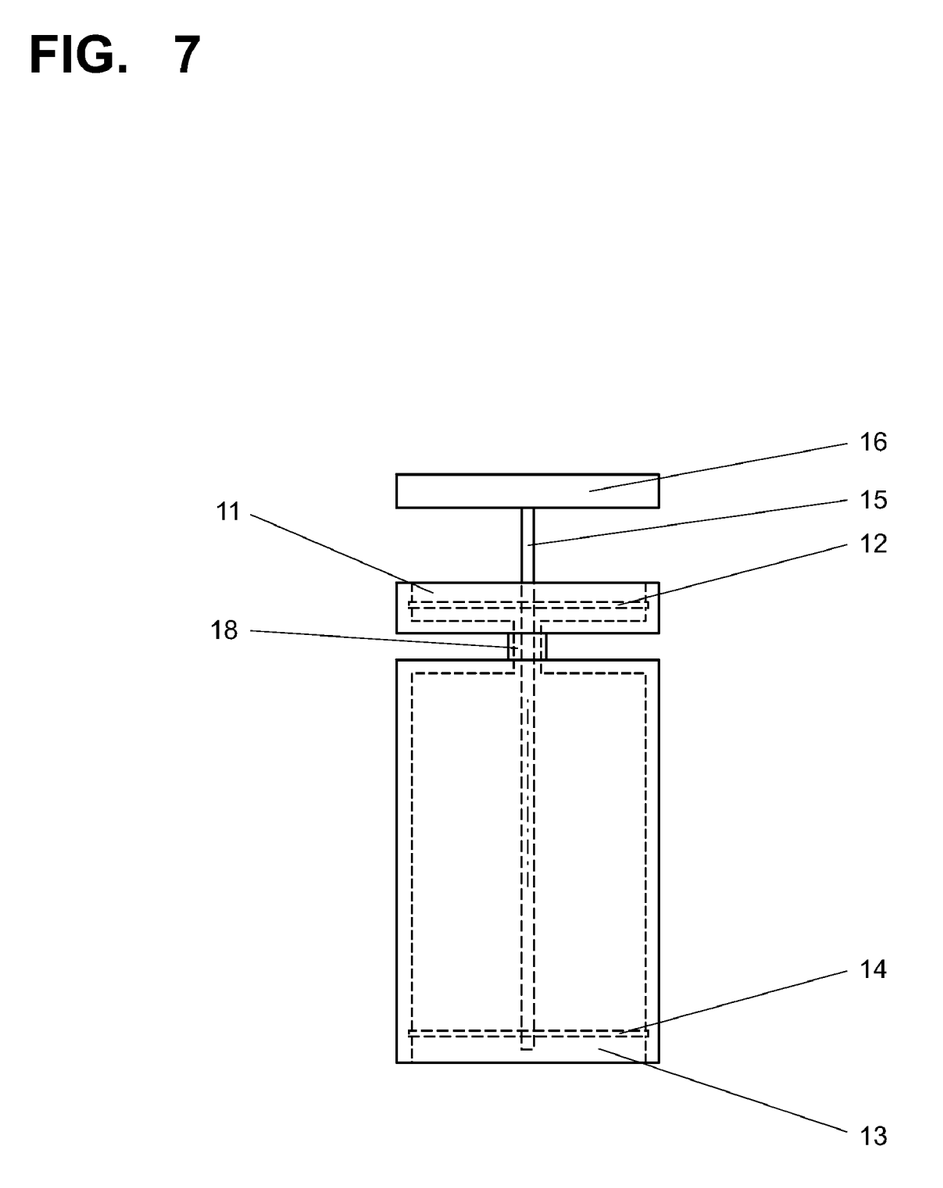
FIG. 7 is an embodiment of the parallel-guiding mechanism wherein the upper ring-shaped portion is made tilt-adjustable in all directions by way of a ring-shaped, thin-walled and likewise plastically deformable constriction formed on the stationary parallel leg.

FIG. 7 shows an embodiment where the stationary parallel leg has a deep constriction closely below the upper diaphragm guide spring 12, wherein the thin-walled ring-shaped constriction 18 forms a plastically and/or elastically deformable bending zone, so that the ring-shaped upper end portion 11 of the stationary parallel leg can be tilt-adjusted about any axis of any horizontal orientation against the lower end portion 13 that encloses the lower diaphragm guide spring 14. The ring-shaped constriction 18 has to have a hole through which the movable parallel leg 15 passes, so that a load receiver 16 can be attached to the upper end of the movable parallel leg 15.

In the embodiments of FIGS. 1-5, the directions of the cartesian axes are determined by the pairs of bending zones 5 and 8 or the fixation elements 26. In the embodiment of FIG. 6, the direction of the connection of a first pair of bending zones 21 can be selected as x-direction. In the case of FIG. 7 an x-direction can be freely selected and the y-direction is obtained from the x-direction by a 90° counterclockwise rotation, while the z-axis is defined by the vertical symmetry axis of the parallel-guiding mechanism. In the embodiments of FIGS. 1-6 there are specific directions defined by the pairs of bending zones and/or by fixation elements 26, which obviously suggest themselves as x- and y-directions. Due to the central symmetry in the geometry of all embodiments relative to the z-axis of the stationary parallel leg, the correlation between a corner load error and the respective tilt adjustment of the upper against the lower diaphragm guide spring is isotropic relative to rotations of the x/y-grid about the z-axis. Thus, it is possible in principle to declare any horizontal direction (relative to the operating position of the parallel-guiding mechanism) as x-axis and the associated orthogonal horizontal direction as y-direction. In practice, it may however be preferable to specify certain directions—determined for example by the pairs of bending zones—as the directions for the weight shift and the torque application in the corner load adjustment, in order to make the adjustment process exactly reproducible and verifiable.

In the illustrated embodiments, the preferred design has been illustrated and described with rotationally symmetric parallel-guiding mechanisms. As described above, the central longitudinal axis of the stationary parallel leg does not necessarily have to coincide with the central longitudinal axis of the stationary parallel leg, nor is it required for the tilt axes to intersect the central longitudinal axis of the stationary parallel leg.

The preferred parallel-guiding elements shown in the examples of embodiments were diaphragm guide springs. Of course, it is likewise possible to connect the movable parallel leg to the stationary parallel leg through parallel-guiding elements that are not configured as diaphragm guide springs. This will be the case in particular in a design where the central longitudinal axes of the movable parallel leg and of the stationary parallel leg are arranged parallel but spaced apart from each other.

What is claimed is:

1. A parallel-guiding mechanism, comprising:
   a stationary parallel leg, with an upper and a lower end portion when oriented vertically in an operating state of the parallel-guiding mechanism;
   a movable parallel leg, having a central longitudinal axis that is also oriented vertically when in the operating state and is surrounded by the stationary parallel leg, the movable parallel leg serving as a force-transmitting connection between a load receiver and a force-measuring cell;
   a first and a second parallel-guiding element, each of which are connected to the movable parallel leg, with the first parallel-guiding element fastened to the upper end portion of the stationary parallel leg and the second parallel-guiding element fastened to the lower end portion thereof, the respective parallel-guiding elements guiding axial movement of the movable parallel leg; and
   a means for tilt-adjusting the respective end portions, about at least one tilt axis, to correct a corner load error, the tilt-adjusting means connecting the respective end portions to each other and comprising at least one of:
      a pair of bending zones, arranged so that one of the tilt axes passes through the pair of bending zones and the central longitudinal axis of the movable parallel leg is in vertical plane between the bending zones;
      a spherical joint with a contact circle, with one of the tilt axes located in a plane that contains a contact circle and with the central longitudinal axis of the movable parallel leg arranged inside the contact circle, and
      a ring-shaped constriction having a passage hole and a neutral fiber, with one of the tilt axes located in a plane that contains the neutral fiber and with the central longitudinal axis of the movable parallel leg arranged within the passage hole.

2. The parallel-guiding mechanism of claim 1, wherein:
   the central longitudinal axis has a point of intersection in common with each of the tilt axes.

3. The parallel-guiding mechanism of claim 2, wherein:
   the central longitudinal axis is orthogonal to each of the tilt axes.

4. The parallel-guiding mechanism of claim 1, further comprising:
   a means for securing and adjusting the respective end portions relative to each other, arranged between the end portions.

5. The parallel-guiding mechanism of claim 1, wherein:
   the stationary parallel leg is rotationally symmetric about the central longitudinal axis; and
   the parallel-guiding elements are soft elastic diaphragm guide springs.

6. The parallel-guiding mechanism of claim 5, wherein:
   the movable parallel leg has a central longitudinal axis that is coincident with the central longitudinal axis of the stationary parallel leg.

7. The parallel-guiding mechanism of claim 1, further comprising:
   at least two lateral incisions in the stationary parallel leg between the respective end portions, defining at least one pair of bending zones.

8. The parallel-guiding mechanism of claim 1, further comprising:
   two first narrow material bridges, formed between and defined by two first incisions that start from diametrically opposite points of the stationary parallel leg and terminate close to a first diameter thereof, the first narrow material bridges and the first incisions located in a first plane between the end portions and horizontally oriented in the operating state of the parallel-guiding mechanism;
   two second narrow material bridges, formed between and defined by two second incisions that start from diametrically opposite points of the stationary parallel leg below the first narrow material bridges and terminate close to a second diameter thereof, the second narrow material bridges and the second incisions located in a second plane between the end portions and horizontally oriented in the operating state of the parallel-guiding mechanism; and
   an intermediate ring portion, formed between the first and second incisions, connected to the upper end portion through the two first narrow material bridges and connected to the lower end portion through the two second narrow material bridges, the respective narrow material bridges and the intermediate ring portion together forming a gimbaled connection between the end portions.

9. The parallel-guiding mechanism of claim 5, further comprising:
   two first narrow material bridges, formed between and defined by two first incisions that start from diametrically opposite points of the stationary parallel leg and terminate close to a first diameter thereof, the first narrow material bridges and the first incisions located in a first plane between the end portions and horizontally oriented in the operating state of the parallel-guiding mechanism;
   at least two pairs of further narrow material bridges, each pair formed between and defined by two further incisions that start from diametrically opposite points of the stationary parallel leg below the first narrow material bridges and terminate close to a second diameter thereof, each of the pairs of the further narrow material bridges offset form each other at equal angular intervals and located in separate horizontal planes below the first horizontal plane in the operating state of the parallel-guiding mechanism; and a support on which the upper end portion and the diaphragm guide spring framed thereby can be tilt-adjusted in all directions, the support formed by the narrow material bridges and a plurality of intermediate ring sections formed from the incisions.

10. The parallel-guiding mechanism of claim 1, wherein: the stationary parallel leg is supported on solid ground.

11. The parallel-guiding mechanism of claim 1, wherein: the means for tilt-adjusting comprises a pair of bending zones that, when plastically deformed by applying a force or a torque, provide a permanent tilt-adjustment of the end portions relative to each other at the tilt axis of the bending zones, by which a corner load error is corrected.

12. The parallel-guiding mechanism of claim 1, wherein: the stationary parallel leg, in the operating position, comprises an essentially straight vertical circular hollow cylinder.

13. The parallel-guiding mechanism of claim 1, further comprising:

a lateral access opening on the stationary parallel leg, providing access to a force-measuring cell that is arranged between the parallel guides and, if applicable, to the components of a signal-processing unit.

14. The parallel-guiding mechanism of claim 1, wherein: the central longitudinal axis is orthogonal to each of the tilt axes.

15. The parallel-guiding mechanism of claim 6, wherein: the stationary parallel leg, in the operating position, comprises an essentially straight vertical circular hollow cylinder.

16. The parallel-guiding mechanism of claim 3, wherein: the stationary parallel leg is rotationally symmetric about the central longitudinal axis; and the parallel-guiding elements are soft elastic diaphragm guide springs.

17. The parallel-guiding mechanism of claim 5, further comprising:

two first narrow material bridges, formed between and defined by two first incisions that start from diametrically opposite points of the stationary parallel leg and terminate close to a first diameter thereof, the first narrow material bridges and the first incisions located in a first plane between the end portions and horizontally oriented in the operating state of the parallel-guiding mechanism;

two second narrow material bridges, formed between and defined by two second incisions that start from diametrically opposite points of the stationary parallel leg below the first narrow material bridges and terminate close to a second diameter thereof, the second narrow material bridges and the second incisions located in a second plane between the end portions and horizontally oriented in the operating state of the parallel-guiding mechanism; and an intermediate ring portion, formed between the first and second incisions, connected to the upper end portion through the two first narrow material bridges and connected to the lower end portion through the two second narrow material bridges, the respective narrow material bridges and the intermediate ring portion together forming a gimbaled connection between the end portions.

18. A gravimetric measuring instrument, comprising: a parallel-guiding mechanism of claim 1.

19. A method for setting the corner load accuracy of a gravimetric measuring instrument that comprises a parallel-guiding mechanism of claim 1, a force-measuring cell, a load receiver operationally connected to the force-measuring cell through the parallel-guiding mechanism, a signal-processing unit connected to and adapted for processing measurement signals of the force-measuring cell, and an indicator operatively connected to the signal-processing unit, the method comprising the steps of:

weighing a test weight, located in the middle of the load receiver, and establishing thereby a base weight on the indicator;

weighing the test weight, located at an edge of the load receiver in a direction perpendicular to a first tilt axis, if applicable, and tilt-adjusting the upper end portion relative to the lower end portion, about the first tilt axis, until the indicator displays the base weight; and weighing the test weight, located at an edge of the load receiver in the direction of the first tilt axis, and tilt-adjusting the upper end portion relative to the lower end portion, about a second tilt axis that is oriented at a right angle to the first tilt axis, until the indicator displays the base weight.

* * * * *